US010265835B2

United States Patent
Piazza et al.

(10) Patent No.: US 10,265,835 B2
(45) Date of Patent: Apr. 23, 2019

(54) PIPE PROCESSING SYSTEMS AND METHODS

(71) Applicant: Advanced Drainage Systems Inc., Hilliard, OH (US)

(72) Inventors: Nicholas James Piazza, Findlay, OH (US); Owen Michael Atchison, Van Buren, OH (US); Tyler James Frost, Upper Sandusky, OH (US)

(73) Assignee: Advanced Drainage Systems Inc., Hilliard, OH (US)

(*) Notice: Subject to any disclaimer, the term of this patent is extended or adjusted under 35 U.S.C. 154(b) by 50 days.

(21) Appl. No.: 15/392,989

(22) Filed: Dec. 28, 2016

(65) Prior Publication Data

US 2018/0178350 A1    Jun. 28, 2018

(51) Int. Cl.
| | |
|---|---|
| *B24B 19/26* | (2006.01) |
| *B24D 9/00* | (2006.01) |
| *B24B 29/08* | (2006.01) |
| *F16L 11/11* | (2006.01) |
| *F16L 11/15* | (2006.01) |
| *B08B 9/023* | (2006.01) |
| *B24B 27/033* | (2006.01) |
| *B24B 27/04* | (2006.01) |
| *B24D 13/04* | (2006.01) |
| *B24B 5/38* | (2006.01) |

(52) U.S. Cl.
CPC .............. *B24D 9/003* (2013.01); *B24B 19/26* (2013.01); *B24B 29/08* (2013.01); *B08B 9/023* (2013.01); *B24B 5/38* (2013.01); *B24B 27/033* (2013.01); *B24B 27/04* (2013.01); *B24D 13/04* (2013.01); *F16L 11/11* (2013.01); *F16L 11/15* (2013.01)

(58) Field of Classification Search
CPC .......... B24D 9/003; B24B 19/26; F16L 11/11; F16L 11/15
USPC ........................................... 451/5, 67, 49, 51
See application file for complete search history.

(56) References Cited

U.S. PATENT DOCUMENTS

| | | | | |
|---|---|---|---|---|
| 3,116,575 | A * | 1/1964 | Block ..................... | B24D 13/04 451/469 |
| 3,161,530 | A * | 12/1964 | Strobel .................... | B05D 1/24 427/195 |
| 3,400,449 | A * | 9/1968 | Szeligo .............. | B23K 11/0876 15/77 |
| 3,540,169 | A * | 11/1970 | Mahoney ............... | B24D 9/003 451/467 |
| 4,063,906 | A * | 12/1977 | Wetzels ................... | B24B 5/18 451/123 |

(Continued)

OTHER PUBLICATIONS

International Search Report and Written Opinion in corresponding International Application No. PCT/US2017/068513 dated Apr. 23, 2018.

*Primary Examiner* — George B Nguyen
(74) *Attorney, Agent, or Firm* — Finnegan, Henderson, Farabow, Garrett & Dunner LLP (57) ABSTRACT

A disclosed pipe scuffing device includes a frame and a shaft coupled to the frame and configured to rotate about a central axis. The pipe scuffing device also includes a drive motor configured to drive the rotation of the shaft. The device further includes one or more abrasive wheels disposed about the shaft and having an abrasive outer surface configured to engage an outer surface of a pipe when rotating with the shaft to remove one or more contaminants from the outer surface of the pipe.

17 Claims, 4 Drawing Sheets

(56) References Cited

U.S. PATENT DOCUMENTS

| | | | |
|---|---|---|---|
| 4,438,056 A * | 3/1984 | Bast | B29C 44/1242 138/149 |
| 4,461,126 A * | 7/1984 | Bowman | B24B 31/006 15/104.05 |
| 4,513,543 A * | 4/1985 | Lawrenson | B24B 1/00 428/209 |
| 4,841,675 A * | 6/1989 | Perneczky | B24B 5/37 451/173 |
| 5,060,423 A * | 10/1991 | Klotz | B24B 35/00 451/10 |
| 5,853,318 A * | 12/1998 | Thom | B02C 4/30 451/425 |
| 6,257,964 B1 * | 7/2001 | Helgren | B24B 5/26 451/258 |
| 6,840,848 B1 * | 1/2005 | Dyar | B24D 13/20 451/344 |
| 9,033,762 B2 * | 5/2015 | Makiuchi | B24B 5/045 409/165 |
| 2010/0095467 A1 | 4/2010 | Kravitch | |
| 2013/0109282 A1 | 5/2013 | Lewkoski et al. | |
| 2014/0092234 A1 | 4/2014 | Thomas et al. | |
| 2018/0117727 A1 * | 5/2018 | Hundebol | B24B 19/26 |

\* cited by examiner

PIPE PROCESSING SYSTEMS AND METHODS

TECHNICAL FIELD

The disclosure relates generally to pipe processing systems and methods, and, more particularly, to pipe scuffing systems and methods.

BACKGROUND

Corrugated pipe is commonly used for drainage of soil and transportation of surface water. The corrugations typically create a pipe profile with steep sides and deep valleys. Given that these pipes are typically constructed using plastic, the corrugations may provide necessary structural integrity for the pipe by providing needed radial stiffness.

Before the corrugated pipe is used for drainage or transportation of water, a corrugated pipe is typically stored in an indoor or outdoor facility with other pipes. Over time, this stock of corrugated pipes may develop one or more contaminants on their outer surfaces and/or oxidation of the outer surfaces may occur. However, it may be desirable for many downstream uses of the corrugated pipe to coat, wrap, or otherwise further process the corrugated pipe. The contaminants that develop on the surface of the corrugated pipe may need to be removed before further processing or use of the corrugated pipe may occur. However, due to the corrugated exterior, the process of removing the contaminants may be time consuming and increase the monetary cost of preparing the corrugated pipes for downstream uses. Accordingly, a need exists for pipe processing systems that address one or more of these drawbacks.

SUMMARY

In one embodiment, a pipe processing system includes a pipe scuffing system. The pipe scuffing system includes a pipe scuffing device having an abrasive wheel assembly including one or more abrasive wheels. The one or more flap wheels have an abrasive surface and contact an outer surface of a pipe. The pipe scuffing system also includes a control system including at least one actuator configured to control the pipe scuffing device to selectively engage and disengage the one or more flap wheels with the outer surface of the pipe.

In another embodiment, a pipe scuffing device includes a frame and a shaft coupled to the frame and configured to rotate about a central axis. The pipe scuffing device also includes a drive motor configured to drive the rotation of the shaft and one or more abrasive wheels disposed about the shaft. The one or more abrasive wheels include an abrasive outer surface configured to engage an outer surface of a pipe when rotating with the shaft to remove one or more contaminants from the outer surface of the pipe.

In another embodiment, a pipe scuffing system includes a corrugated pipe having a pitch defined by one or more corrugations disposed along a corrugated outer wall having axially adjacent, outwardly-extending corrugation crests, separated by corrugation valleys. The pipe scuffing system also includes a pipe scuffing device including a plurality of abrasive wheels each having an abrasive surface. A ratio of a width of each of the plurality of abrasive wheels to the pitch of the corrugated pipe is between ⅓ and ⅙.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

As discussed in further detail below, various embodiments of pipe processing systems and methods are provided to process pipes in preparation for one or more downstream uses. Embodiments of the pipe processing system may include a pipe scuffing device operable to remove a layer of material (e.g., contaminants) from an outer surface of a pipe. In some embodiments, stripping of the layer of material from the pipe may enable a molecular bond to be established between the stripped surface of the pipe and an applied outer wrap, thus increasing the likelihood of integration of the outer wrap and the pipe as compared to wrapping the pipe without first removing the layer of material. Further, the stripping of the layer of material may enable the outer surface of the pipe to be otherwise processed. For example, the outer surface may be painted. For further example, the outer surface may be printed. Still further, the outer surface may be stripped to enable application of an adhesive (e.g., a sticker).

Some disclosed embodiments of the pipe scuffing device may include one or more features that enable scuffing of pipes with various contours and configurations, such as a corrugated exterior. For example, in one embodiment, a flap wheel assembly may include one or more flap wheels configured to adapt to the corrugated shape of the pipe such that both the peaks and valleys of the corrugated pipe are scuffed. For further example, in some embodiments, the dimensions of the one or more flap wheels may be selected for compatibility with the dimensions of the corrugated pipe to increase the likelihood that the one or more flap wheels follow the contours of the pipe. These and other features of presently contemplated embodiments are discussed in more detail below.

Figure 1:
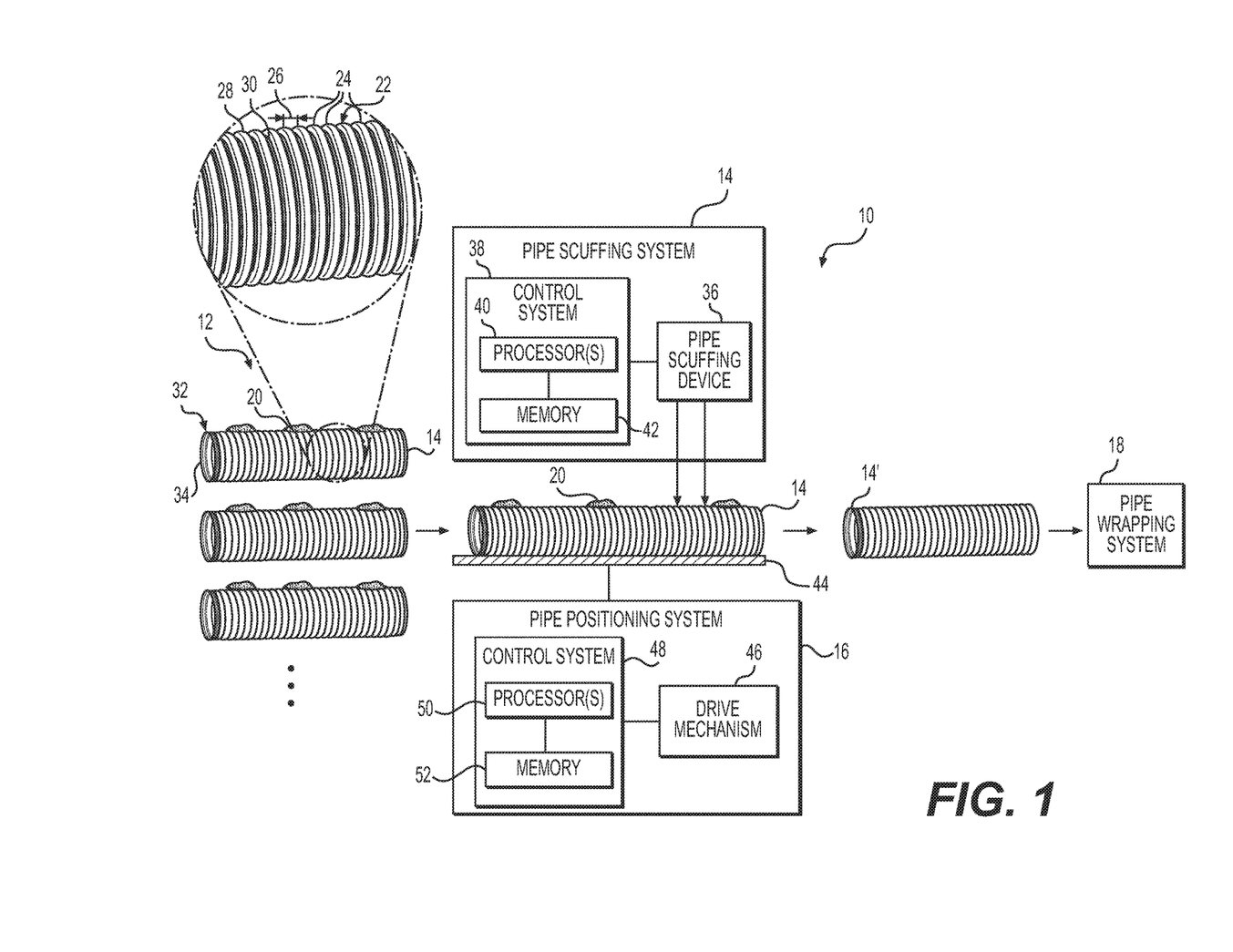
FIG. 1 illustrates a pipe processing system according to a disclosed embodiment.

Turning now to the drawings, FIG. 1 illustrates an embodiment of a pipe processing system 10 in accordance with one embodiment of the present disclosure. In the illustrated embodiment, the pipe processing system 10 includes a stock of a plurality of pipes 12, a pipe scuffing system 14, a pipe positioning system 16, and a pipe wrapping system 18. During operation, a pipe 14 from the plurality of pipes 12 may be positioned by the pipe positioning system 16 for scuffing by the pipe scuffing system 14 to produce a scuffed pipe 14' having a layer of material removed, as compared to pipe 14. For example, the scuffed pipe 14' may be free of contaminants 20 present on the pipe 14 before scuffing. The scuffed pipe 14' may then be further processed by the pipe wrapping system 18 to apply an outer wrap to the scuffed pipe 14'.

In the embodiment shown in FIG. 1, the pipe 14 is corrugated such that the outer surface 22 is contoured and includes a series of corrugations 24. The corrugations 24 may be disposed along the entire length of the pipe 14 or along only a portion of the corrugated pipe 14. Further, in other embodiments, the corrugations 24 may be formed in any desired shape, such as spiral or annular corrugations, depending on implementation-specific considerations. For example, the corrugations 120 may spiral in the longitudinal direction around the circumference of the pipe 14 to enable greater structural integrity in implementations in which a wall of the pipe 14 is formed from plastic.

In some embodiments, the corrugations 24 may have a pitch 26 defined by peaks 28 and valleys 30 that form the corrugations 24. As used herein, the pitch 26 may be a slope measurement measured between adjacent peaks 28 and/or adjacent valleys 30. The pitch 26 may vary depending on the given implementation and may be determined, for example, based on a downstream use of the pipe. For example, in one embodiment in which the pipe 14 is used to transport sewage water, the pitch 26 may be approximately 3 inches (e.g., between 2.8 inches and 3.2 inches). However, presently contemplated embodiments are not limited to any particular pitch 26, and the pitch 26 may vary in other implementations. Further, in other embodiments, the pipe 14 may not be corrugated. Indeed, in some embodiments, the outer surface 22 may be smooth (e.g., without the presence of the peaks 28 and valleys 30) along some or all of the length of the pipe 14.

In some embodiments, an end portion 32 of the pipe 14 may include a connector 34 to enable coupling of two or more of the pipes 12 together. For example, the connector 34 may be a bell (e.g., as in the illustrated pipe 14) or a spigot. In such an embodiment, the bell may be configured to surround and contain a spigot end of another pipe. In other embodiments, the connector 34 may be a spigot configured to be received in a bell end of another pipe. In such embodiments, the spigot may have a smaller outer diameter than the bell, so that the spigot may fit into the bell. However, other types of connectors 34 may also be used with the pipe 14. For example, any type of coupler known to those of ordinary skill in the art may be used to connect some or all of the pipes 12 together.

Indeed, it should be noted that the illustrated pipe 14 is merely an example subject to a variety of implementation-specific variations. It should be appreciated that the pipe scuffing system 14 and the pipe positioning system 16 may be used with any suitable type of pipe 14, not limited to the embodiments shown here. Further, although the stock of the plurality of pipes 12 is shown including three pipes 14, any number of pipes may be included in other embodiments. Indeed, the pipe 14 may be sourced from the stock of the plurality of pipes 12, or from any other location upstream of the pipe scuffing system 14.

Additionally, it should be appreciated that although the contaminants 20 are illustrated on the surface of the pipe 14, the contaminants 20 may or may not be visible to the naked eye, may be disposed at any location(s) along the length of the pipe 14 (e.g., in valleys 30, on peaks 28, on connector 34, etc.), may be impurities present in an outer layer of the pipe 14, and so forth. For example, in some embodiments, the pipe 14 may undergo surface oxidation (represented by contaminants 20). In some embodiments, oxidation may occur regardless of whether the pipe stock 12 is stored indoors or outdoors. Because the surface oxidation may impair the ability to bond anything desired to the surface of the pipe 14, presently disclosed embodiments may enable removal of the oxidized layer. Indeed, the contaminants 20 are merely illustrative of the impurities that may be present on or in the layer of material forming the outer surface 22 of the pipe 14.

Turning now to the pipe scuffing system 14, the system 14 may include one or more components that enable removal of a layer of material from the outer surface 22 of the pipe 14. In the illustrated embodiment, the pipe scuffing system 14 includes a pipe scuffing device 36 and a control system 38 configured to control the pipe scuffing device 36. During operation, the pipe scuffing device 36 is configured to remove a layer of material from the outer surface 22 of the pipe 14 to remove one or more contaminants 20. The contaminants 20 removed via scuffing may include, for example, rust, dirt, rocks, oxidation, water, other fluids or liquids, or any other contaminant. To that end, the pipe scuffing device 36 may include one or more abrasive elements configured to abrade the outer surface 22 of the pipe 14 when in contact with the pipe 14. For example, the pipe scuffing device 36 may include grinding wheels, flap discs, flap wheels, sand paper, steel, wire wheels, and so forth.

The illustrated control system 38 includes one or more processors 40 and memory 42. The one or more processors 40 (e.g., microprocessor(s), application-specific integrated circuit (ASIC), field-programmable gate array (FPGA), etc.) may be configured to execute a control algorithm. By way of example, the control algorithm may be provided as machine-readable encoded instructions stored on a machine-readable medium, such as the memory 42, and may provide control signals for controlling operation of the pipe scuffing device 36. The control signals may control the pipe scuffing device 36 to selectively engage and disengage one or more abrasive elements with the pipe 14, for example, based on a desired level of scuff.

The memory 42 may be a tangible, non-transitory, machine readable medium. For example, the memory 42 may be volatile or non-volatile memory, such as read only memory (ROM), random access memory (RAM), magnetic storage memory, optical storage memory, or a combination thereof. Furthermore, a variety of control parameters may be stored in the memory 42 along with code configured to provide a specific output (e.g., enable contact with pipe 14, disable contact with pipe 14, etc.) to the pipe scuffing device 36 during operation. In some embodiments, the processor(s) 40 may also receive an input from a user interface through which the user may choose a process and/or input desired parameters (e.g., desired scuff depth, pipe type, pitch of corrugations on the pipe 14, and so forth).

The pipe positioning system 16 includes one or more components configured to position the pipe 14 with respect to the pipe scuffing device 36 to enable scuffing of the pipe 14. Specifically, in the illustrated embodiment, the pipe positioning system 16 includes a support 44 configured to support the pipe 14. The support 44 may include any suitable table, conveyor belt, frame, and so forth, known to those of ordinary skill in the art. A drive mechanism 46 is configured to drive movement of the support 44, the pipe 14, or both to enable a desired positioning of the pipe 14. The drive mechanism 46 may include motors, engines, circuitry, etc. to drive movement of the support 44 and/or the pipe 14. The drive mechanism 46 may be controlled by a control system 48 including one or more processors 50 and memory 52. The one or more processors 50 and memory 52 may include components similar to those described above for the one or more processors 40 and memory 42 in the pipe scuffing system 14. However, the control system 48 may utilize such components to control the position of the pipe 14 relative to the pipe scuffing device 36. To that end, the control system 38 and the control system 48 may communicate via any known means (e.g., wirelessly, via wired connections, etc.) to coordinate control of the pipe scuffing device 36 and the position of the pipe 14. For example, in one embodiment, the control systems 38 and 48 may coordinate such that one or more flap or wire wheels of the pipe scuffing device 36 rotate in a direction counter to a rotational direction of the pipe 14.

Further, in some embodiments, the control systems 38 and 48 may control the relative movement of the pipe 14 and the pipe scuffing device 36 to enable the end 32 of the pipe 14 to be scuffed differently than the remaining length of the pipe 14. For example, the connector 34 may need to be processed for a different period of time than the remainder of the length of the pipe 14, for example, to obtain a different level of scuff. For further example, in one embodiment, during processing of the end portion 32, the pipe 14 may be rotated about its longitudinal axis while the pipe scuffing device 36 is translated laterally.

Once the pipe 14 is scuffed by the pipe scuffing device 36, a scuffed pipe 14' may be ready for any desired downstream processing or use. For example, in the illustrated embodiment, the scuffed pipe 14' may be transferred to the pipe wrapping station 18 for application of an additional layer of material. For example, pipe wrapping station 18 may apply an outer wrap formed using fibers and/or plastic. In one embodiment of the applied outer wrap, fibers (e.g., fiberglass or carbon fibers) may be embedded in plastic. Polymers such as high density polyethylene (HDPE), polypropylene (PP), or polyvinyl chloride (PVC) may be used as the plastic. Other fibers or plastics may also be used, depending on implementation-specific considerations. Still further, the pipe wrapping system 18 may be configured to otherwise process the pipe 14'. For example, the pipe wrapping system 18 may apply paint to the scuffed surface, apply an adhesive to the scuffed surface, etc.

The removal of a layer of material from the pipe 14 prior to application of the outer wrap by pipe wrapping station 18 may offer one or more advantages over systems that do not include pipe scuffing prior to wrapping. For example, in some embodiments, scuffing of the pipe 14 better enables a molecular bond to be formed between the applied outer wrap and the outer surface 22 of the pipe 14' because the pipe 14' may have a reduced level of contaminants 20, which may be present due to storage in the stock of pipes 12 for a period of time.

Figure 2A:
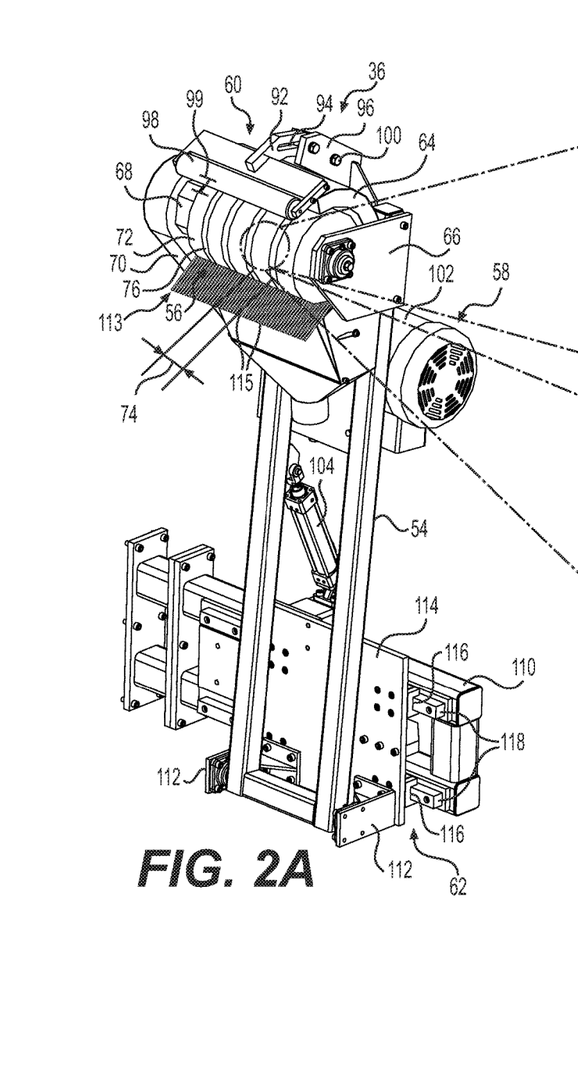
FIG. 2A is a front, top perspective view of a pipe scuffing device according to a disclosed embodiment.
Figure 3:
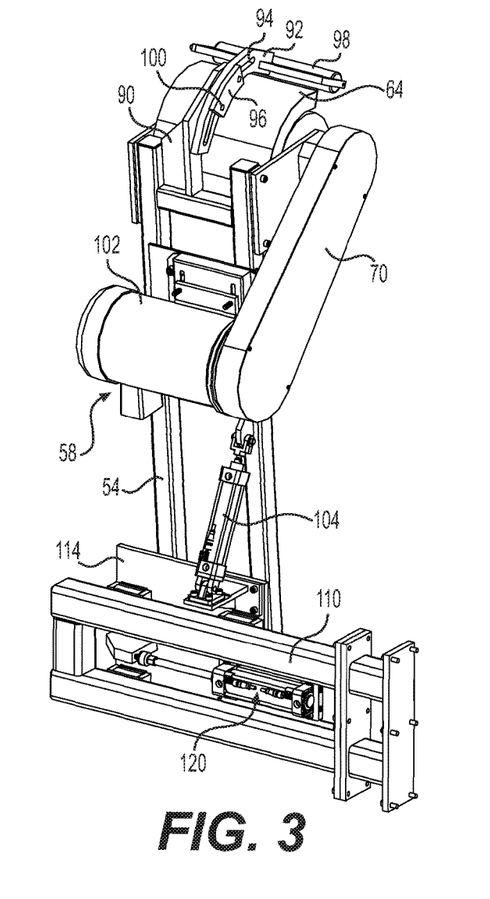
FIG. 3 is a rear, top perspective view of the pipe scuffing device of FIG. 2.

FIGS. 2A and 3 illustrate front and rear perspective views, respectively, of one embodiment of the pipe scuffing device 36. In this embodiment, the pipe scuffing device 36 includes a frame 54 that supports one or more scuffing and connectional components. Specifically, in the illustrated embodiment, the frame 54 supports an abrasive wheel assembly 56, a drive system 58, and a guide roller assembly 60. The frame 54 is coupled to a positional system 62 configured to enable the pipe scuffing device 36 to be positioned with respect to the pipe 14.

In the illustrated embodiment, the frame 54 includes a partial cover 64 for the abrasive wheel assembly 56 and a panel 66 to which one end of a shaft 68 is mounted. The other end of the shaft 68 is mounted to a pivot arm 70. In the embodiment shown, the abrasive wheel assembly 56 is mounted to the shaft 68 such that a plurality of abrasive wheels 72 extends radially about the shaft 68. The abrasive wheels 72 may be any suitable type of abrasive wheel 72. For example, in the embodiment shown in FIG. 2B, each abrasive wheel 72 is a flap wheel 79. For further example, in the embodiment shown in FIG. 2C, each abrasive wheel 72 is a wire wheel 81. However, in other embodiments, the abrasive wheel 72 is subject to implementation-specific variations.

The abrasive wheel 72 has a width 74 and is disposed at a distance 76 from each adjacent abrasive wheel 72. In some embodiments, the distance 76 may be uniform between each of the abrasive wheels 72. However, in other embodiments, the distance 76 may vary, depending on implementation-specific considerations. For example, the distance 76 may be uniform between a subset of the abrasive wheels 72 with the last abrasive wheel 72 separated from an adjacent abrasive wheel 72 by a greater distance. Such a configuration may be desirable in implementations in which the subset of the abrasive wheels are configured to scuff the corrugations 24 of the pipe 14, and the distanced abrasive wheel is configured to scuff the connector 34 of the pipe 14.

Each abrasive wheel 72 may include one or more features that enable scuffing of the pipe 14. For example, in the embodiment illustrated in FIG. 2B, the flap wheel 79 includes a plurality of flaps 78 having an abrasive material 80 configured to scuff the pipe 14. The abrasive material 80 may be integrated into the flaps 78 in any desirable manner, such as being disposed on edges 82 and/or surfaces 84, integrated into the material forming the flaps 78, and so forth. Further, in some embodiments, the placement of the abrasive material 80 on the flap wheel 79, e.g., along the edges 82 and the surfaces 84 of the flaps 78, may enable the flap wheel 79 to be used for a longer period of time, as compared to a continuous wheel not having flaps 78. For example, over time, the abrasive material 80 may wear, and by distributing this abrasive wear over multiple portions of multiple flaps 78, worn areas may be present while the overall abrasive quality of the flap wheel 79 is acceptable. Further, the abrasive material 80 may be any suitable abrasive material or composite, including, but not limited to, sand paper, wire brush (e.g., steel, brass), ceramic brush, steel, rasp, flexible fingers with abrasive, aluminum oxide, ceramic, and so forth.

Figure 2B:
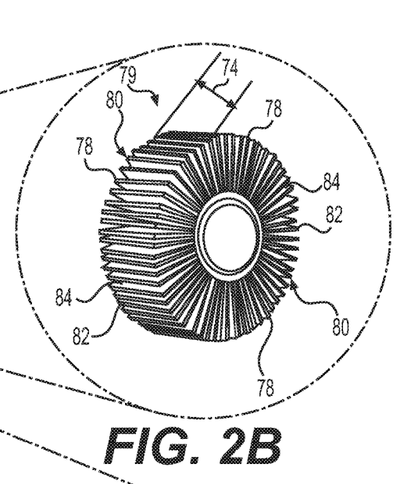
FIG. 2B is a schematic view of a flap wheel assembly according to a to a disclosed embodiment.

Feature(s) of the abrasive wheel assembly 56 may enable the assembly 56 to follow the contour of the pipe 14. For example, in some embodiments, each of the flaps 78 may be flexible to enable the flaps 78 to adapt to the contour of the pipe 14. For example, the diameter of the abrasive wheel may coincide with the depth of the corrugation in some embodiments. For further example, the flaps 78 may bend to enable scuffing of both the peaks 28 and the valleys 30.

Figure 2C:
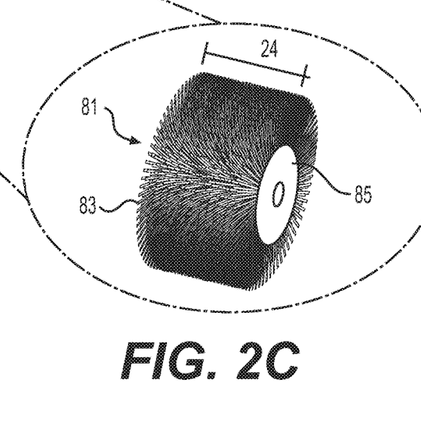
FIG. 2C is a schematic view of a wire wheel assembly according to a disclosed embodiment.

In the embodiment illustrated in FIG. 2C, the abrasive wheel assembly 56 may include one or more wire wheels 81 having one or more wires 83. In this embodiment, the one or more wires 83 may be bundled into wire groups 85 disposed circumferentially around the wire wheel 81. However, in other embodiments, the wires 83 may be arranged in any suitable manner. For example, the wires 83 may be crimped. The wires 83 may be wound together and twisted to form the wire groups 85. Indeed, the wires 83 may be arranged in any suitable manner to form the abrasive wire wheel 81, not limited to the depicted embodiment.

Further, in some embodiments, the width 74 of the abrasive wheel 72 may be determined based on the pitch 26 of the corrugations 24 in the pipe 14. For example, in some embodiments, a relationship may exist between the pitch 26 and the width 74 such that as the pitch 26 is reduced, the width 74 is also reduced. More specifically, in some embodiments, a ratio between the width 74 of the abrasive wheel 72 and the pitch 26 of the pipe 14 may be between approximately ⅓ (e.g., between 0.3 and 0.36) and approximately ⅙ (e.g., between 0.13 and 0.19). For example, the pitch 26 may be 3 inches, and the width 74 may be 1 inch such that the ratio is ⅓. For further example, the abrasive wheel 72 may have a width of ½" to 1" and the corrugations may have a pitch of 3" to 6". The foregoing ratio may offer one or more advantages, such as by enabling the flaps 78 to follow the contour of the corrugations 30 of the pipe 14.

Although the illustrated abrasive wheel assembly 56 includes multiple abrasive wheels 72, in other embodiments, only a single abrasive wheel 72 may be used. Still further, in other embodiments, the abrasive wheel assembly 56 may be replaced with one or more cylindrical wheels disposed about the shaft 68 and having the abrasive material 80 thereon and/or integrated therein. Such an arrangement may be desirable in implementations in which the pipe 14 is not corrugated. Indeed, the pipe scuffing device 36 and abrasive wheel assembly 56 shown herein are merely examples.

The guide roller assembly 60 is coupled to the frame 54 via support structure 90 and roller frame 92. Support structure 92 includes a track 94 along which bracket 96 can move to enable positioning of a guide roller 98. The bracket 96 is configured to move along the track 94 for positioning and to lock in place at a fixed position along the track 94 via fasteners 100. During a scuffing operation, when the abrasive wheel assembly 56 is positioned to contact the pipe 14, the guide roller 98 is configured to rest on the outer surface 22 of the pipe 14 and passively follow the contours of the pipe 14. The foregoing feature may enable the guide roller 98 to increase the likelihood that only desired portions of the pipe 14 are scuffed.

Further, the guide roller 98 may also determine the depth of the scuff. Specifically, since the guide roller 98 is located above the abrasive wheel assembly 56, it may determine the depth at which the abrasive wheels 72 can contact the pipe 14. For example, a distance 99 between the guide roller 98 and the abrasive wheel assembly 56 may determine the depth at which the abrasive wheels 72 can scuff by fixing the relative distance between the abrasive wheel assembly 56 and the pipe 14. In some embodiments, the distance 99 may be predetermined before a scuffing operation to set the scuff depth for the operation and/or may be readjusted to control the depth of the scuff of the pipe 14.

In some embodiments, the pipe scuffing device 36 may include a wiping device 113, as shown in FIG. 2A. In one embodiment, the wiping device 113 may be a brush having bristles 115. The wiping device 113 may cooperate with the abrasive wheel assembly 56 to clean the outer surface of the pipe 14 as it is scuffed (e.g., to remove the contaminants 20 from the surface of the pipe 14 after the abrasive wheel assembly 56 dislodges the contaminants 20). The wiping device 113 may also enable containment of the contaminants 20 during operation. In some embodiments, the wiping device 113 may be positioned on the downstream side of the abrasive wheel assembly 56, as shown in FIG. 2A, to allow the abrasive wheels 72 to remove material but to help catch any debris and to wipe the corrugations. However, the location and quantity of the wiping device 113 is merely illustrative. Indeed, in some embodiments, the wiping device 113 may instead be located on the upstream side of the abrasive wheel assembly 56 (e.g., adjacent the guide roller 98). In still further embodiments, the wiping device 113 may include two wiping devices, one located downstream of the abrasive wheel assembly 56 and the other located upstream of the abrasive wheel assembly 56. Further, in some embodiments, the wiping device 113 may also be flexible such that it follows the contours of the pipe 14.

The drive system 58 is configured to drive the movement of the abrasive wheel assembly 56. To that end, the drive system 58 in the illustrated embodiment includes a drive motor 102 and an engage/disengage cylinder 104. During operation, the drive motor 102 and the cylinder 104 cooperate under control of the processor(s) 40 to rotate the shaft 68 upon which the abrasive wheel assembly 56 is disposed. The processor(s) 40 may also control the drive motor 102 and the cylinder 104 to control movement of the abrasive wheel assembly 56 toward and away from the pipe 14 to selectively engage and disengage the abrasive wheel assembly 56 to and from the pipe 14. For example, the processor(s) 40 may control the cylinder 104 to an engage position such that the pivot arm 70 moves the abrasive wheel assembly 56 toward the pipe 14, and control the cylinder 104 to a disengage position to disengage the abrasive wheel assembly 56 from the pipe 14.

The positional system 62 is configured to enable the position of the abrasive wheel assembly 56 to be altered along the longitudinal axis of the pipe 14. In the illustrated embodiment, the positional system 62 includes a frame 110 configured to be mounted to the support 44 for the pipe 14, or any other suitable structure in the pipe positioning system 16. The frame 54 of the pipe scuffing device 36 is configured to couple to the frame 110 of the positional system 62 via brackets 112 and plate 114. The plate 114 includes tracks 116 configured to receive rails 118 disposed on the frame 110. A slide cylinder 120 is configured to enable movement of the frame 54 along the length of the tracks 116 to longitudinally position and reposition the abrasive wheel assembly 56. The foregoing feature may enable the abrasive wheel assembly 56 to scuff a first longitudinal position along the length of the pipe 14 and be moved to additional longitudinal positions to scuff additional portions along the length of the pipe 14.

In some embodiments, it may be desirable for the abrasive wheel assembly 56 to move longitudinally in the direction of the axis of the pipe 14 to enable greater operational flexibility. For example, translational movement may be desirable at the end of the scuffing cycle so that the abrasive wheels 72 remain in contact with the exterior of the pipe 14. For example, in one embodiment, the rails 118 may be equal to or greater than the length of the pipe 14. In this embodiment, the longitudinal movement of the abrasive wheel assembly 56 may enable the pipe 14 to be scuffed without the need to translate the pipe 14. In another embodiment, the rails 188 may be a length equal to half the length of the abrasive wheel assembly 56. In this embodiment, the translational movement may be used to keep the abrasive wheel assembly 56 in contact with the pipe 14 when reaching the end of a scuffing cycle.

Figure 4:
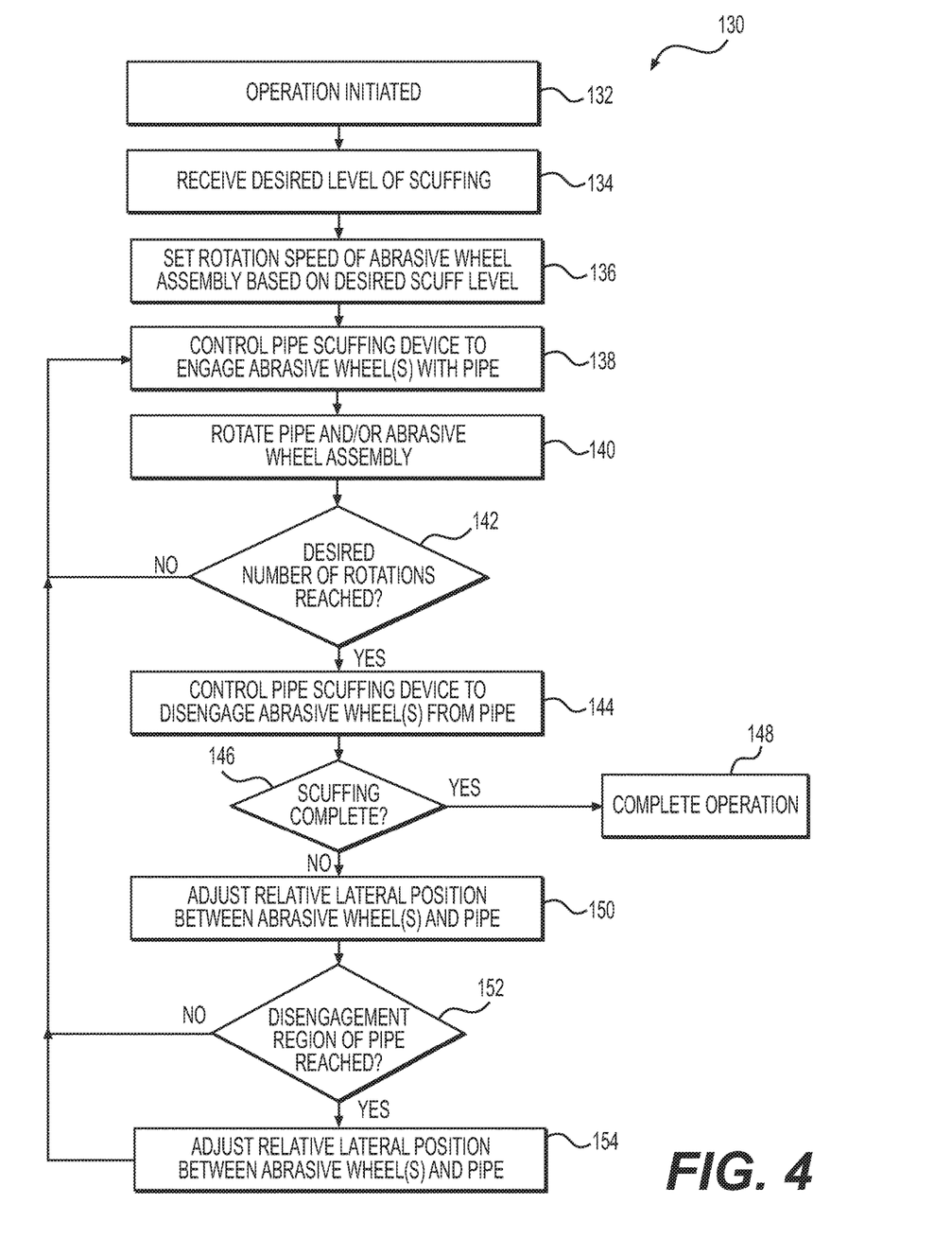
FIG. 4 is a flow chart illustrating a method of controlling a pipe scuffing device according to a disclosed embodiment.

FIG. 4 is a flow chart illustrating an embodiment of a method 130 that may be used to control the pipe processing system 10 in accordance with one embodiment. The method 130 may be performed by the processor(s) 40 in the pipe scuffing system 14, the processor(s) 50 in the pipe positioning system 16, a combination thereof, or any of the processor(s) 40, 50 in combination with other control systems.

In the illustrated embodiment, the method 130 begins when a pipe scuffing operation is initiated (block 132). The method 130 includes receiving a desired level of scuffing (block 134). For example, the processor executing the method 130 may receive a signal indicating that a user would like to abrade or gouge the pipe 14. For further example, a user may indicate a depth of the layer of material to be removed from the pipe via scuffing. In some embodiments, the depth of the layer of material removed via scuffing may be automatically determined based on a length of time the pipe 14 has been stored after being produced.

The method 130 may also include setting a rotation speed of the abrasive wheel assembly 56 based on the desired scuff level (block 136). For example, the rotation speed may be set higher for deeper scuffs and lower for shallower scuffs. The method 130 may further include controlling the pipe scuffing device 36 to engage the abrasive wheel(s) 72 with the pipe 14 (block 138). For example, the engage cylinder 104 may be activated to reposition pivot arm 70 to move the abrasive wheel assembly 56 toward the pipe 14. The method 130 then includes controlling the position of the pipe 14, the pipe scuffing device 36, or both to effectuate relative rotations between the pipe 14 and the abrasive wheel assembly 56 (block 140). For example, in one embodiment, the abrasive wheel assembly 56 may be rotated in a first rotational direction (e.g., clockwise), and the pipe 14 may be rotated, e.g., via support 44, in a second rotational direction (e.g., counterclockwise) counter to the first rotational direction. The opposite spin directions may enable more efficient scuffing in certain implementations. However, in other embodiments, the pipe 14 and the abrasive wheel assembly 56 may rotate in the same direction. Still further, in some embodiments, only one of the abrasive wheel assembly 56 and the pipe 14 may rotate.

The method 130 may further query whether a desired number of rotations are reached (block 142). For example, in some embodiments, the pipe 14 and the abrasive wheel assembly 56 may each be controlled to complete one 360 degree rotation before disengagement. However, in other embodiments, multiple rotations may be completed before disengagement. In the illustrated method 130, if the desired number of rotations is not yet reached, the pipe scuffing device maintains engagement with the pipe 14. However, if the desired number of rotations is reached, the method 130 includes controlling the pipe scuffing device 36 to disengage the abrasive wheel(s) 72 from the pipe 14 (block 144).

The method 130 may query whether scuffing is complete (block 146). If scuffing is complete, the operation is ended (block 148). Completion of scuffing may be determined in any suitable manner. For example, scuffing may be complete when it is automatically or manually determined that the entire desired length of the pipe 14 has been scuffed. For further example, in one embodiment, the presence of the connector 34 may be determined, and scuffing may be determined to be complete when the connector 34 is reached.

If scuffing is not complete, the method 130 may include adjusting the relative lateral position between the abrasive wheel(s) 72 and the pipe 14 (block 150). For example, slide cylinder 120 may be activated to move the frame 54 along the length of the tracks 116 to move the abrasive wheel assembly 56. In other embodiments, the support 44 for the pipe 14 may be adjusted to reposition the pipe 14 with respect to the abrasive wheel assembly 56.

The method 130 may query whether a disengagement region of the pipe 14 is reached (block 152). If a disengagement region is reached, the method 130 may include adjusting the relative position between the abrasive wheel(s) 72 and the pipe 14 (block 154) to avoid the disengagement region. For example, the connector 34 may be set as a disengagement region. When the connector 34 is detected, the method 130 may proceed to another region, thus avoiding the area it is not desirable to scuff. However, in other embodiments, the connector 34 may be included in the region to be scuffed.

It should be noted that the products and/or processes disclosed may be used in combination or separately. Additionally, exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the prior detailed description be considered as exemplary only, with the true scope and spirit being indicated by the following claims.

The examples presented herein are for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

What is claimed is:

1. A pipe processing system, comprising:
 a pipe scuffing system, comprising:
 a pipe scuffing device comprising an abrasive wheel assembly including one or more abrasive wheels having an abrasive surface and being configured to contact an outer surface of a pipe; and
 a control system configured to control the pipe scuffing device to selectively engage and disengage the one or more abrasive wheels with the outer surface of the pipe;
 a pipe positioning system comprising a support configured to support the pipe; and
 wherein the pipe scuffing device further comprises a frame configured to support the abrasive wheel assembly and to couple to the support such that the abrasive wheel assembly is configured to ascend and descend along a vertical length of the frame to engage and disengage with the pipe.

2. The pipe processing system of claim 1, wherein the pipe positioning system comprises a drive mechanism configured to alter a relative position between the pipe and the one or more abrasive wheels by driving movement of the support.

3. The pipe processing system of claim 2, wherein the drive mechanism is configured to drive movement of the support such that a spin direction of the pipe is counter to a spin direction of the one or more abrasive wheels.

4. The pipe processing system of claim 1, further comprising a pipe wrapping system configured to receive the pipe after the pipe is scuffed by the pipe scuffing device and to add an additional layer of material to the pipe.

5. The pipe processing system of claim 1, wherein at least one processor of the control system is configured to control the one or more abrasive wheels to rotate in a direction counter to a rotation direction of the pipe.

6. The pipe processing system of claim 1, wherein the one or more abrasive wheels comprise one or more flap wheels or one or more wire wheels.

7. The pipe processing system of claim 1, wherein a ratio of a width of each of the one or more abrasive wheels to a pitch of corrugations in the pipe is between $\frac{1}{3}$ and $\frac{1}{6}$.

8. The pipe processing system of claim 1, wherein the pipe scuffing device further comprises a guide roller configured to engage with the pipe when the one or more flap wheels engage with the pipe at a distance that determines a depth of a scuff of the pipe.

9. A pipe scuffing device, comprising:
   a frame;
   a shaft coupled to the frame and configured to rotate about a central axis;
   a drive motor configured to drive the rotation of the shaft;
   one or more abrasive wheels disposed about the shaft and comprising an abrasive outer surface configured to engage an outer surface of a pipe when rotating with the shaft to remove one or more contaminants from the outer surface of the pipe; and
   a guide roller coupled to the frame and configured to engage the pipe when the one or more abrasive wheels engage the pipe to determine a depth of scuffing of the pipe.

10. The pipe scuffing device of claim 9, wherein a ratio between a width of each of the one or more abrasive wheels and a pitch of corrugations in the pipe is between $\frac{1}{3}$ and $\frac{1}{6}$.

11. The pipe scuffing device of claim 9, wherein the frame further comprises a pulley arm coupled to the drive motor and to the shaft and configured to alter a position of the shaft between a disengaged position and an engaged position with respect to the pipe.

12. The pipe scuffing device of claim 9, wherein the frame further comprises one or more tracks configured to enable translational movement of the shaft and one or more abrasive wheels along the length of the one or more tracks.

13. The pipe scuffing device of claim 12, wherein the one or more tracks are disposed on a bracket of the frame configured to couple to a support for supporting the pipe.

14. The pipe scuffing device of claim 9, wherein the one or more abrasive wheels are one or more flap wheels or one or more wire wheels.

15. The pipe scuffing device of claim 9, wherein the one or more abrasive wheels comprises a plurality of flap wheels, and each of the plurality of flap wheels is separated by a uniform distance.

16. A pipe scuffing system, comprising:
   a corrugated pipe having a pitch defined by one or more corrugations disposed along a corrugated outer wall having axially adjacent, outwardly-extending corrugation crests, separated by corrugation valleys; and
   a pipe scuffing device comprising a plurality of abrasive wheels each having an abrasive surface, wherein a ratio of a width of each of the plurality of flap wheels to the pitch of the corrugated pipe is between $\frac{1}{3}$ and $\frac{1}{6}$.

17. The pipe scuffing system of claim 16, further comprising a control system comprising at least one processor configured to control the pipe scuffing device to rotate the plurality of abrasive wheels in a direction counter to a rotation direction of the corrugated pipe.

* * * * *